US010638791B2

(12) United States Patent
Plews et al.

(10) Patent No.: US 10,638,791 B2
(45) Date of Patent: May 5, 2020

(54) METHODS OF MANUFACTURING A DOUBLE-WALLED TUBE

(71) Applicant: British American Tobacco (Investments) Limited, London (GB)

(72) Inventors: Graham Plews, London (GB); Richard Pike, London (GB)

(73) Assignee: British American Tobacco (Investments) Limited, London (GB)

( * ) Notice: Subject to any disclaimer, the term of this patent is extended or adjusted under 35 U.S.C. 154(b) by 394 days.

(21) Appl. No.: 15/521,069

(22) PCT Filed: Oct. 21, 2015

(86) PCT No.: PCT/EP2015/074394
§ 371 (c)(1),
(2) Date: Apr. 21, 2017

(87) PCT Pub. No.: WO2016/062776
PCT Pub. Date: Apr. 28, 2016

(65) Prior Publication Data
US 2017/0332700 A1    Nov. 23, 2017

(30) Foreign Application Priority Data

Oct. 22, 2014  (GB) .................................. 1418771.0

(51) Int. Cl.
*F16L 9/18*      (2006.01)
*A24F 47/00*     (2020.01)
(Continued)

(52) U.S. Cl.
CPC ............ *A24F 47/006* (2013.01); *B29C 48/09* (2019.02); *F16L 9/18* (2013.01); *F28D 7/106* (2013.01);
(Continued)

(58) Field of Classification Search
CPC ........ F28D 7/106; F28D 20/02; F28D 20/028; F28D 21/062; F16L 9/18; B29C 48/09
See application file for complete search history.

(56) References Cited

U.S. PATENT DOCUMENTS

| 3,636,151 A | * | 1/1972 | Nagai ..................... B29C 49/00 |
| | | | 264/526 |
| 3,932,104 A | * | 1/1976 | Schneider ........... B29C 49/0031 |
| | | | 425/503 |

(Continued)

FOREIGN PATENT DOCUMENTS

| CN | 1077360 | 10/1993 |
| CN | 101306576 | 11/2008 |

(Continued)

OTHER PUBLICATIONS

Translation of Chinese Office Action and Search Report, Application No. 201580057479.5, dated May 31, 2019, 5 pages.

(Continued)

*Primary Examiner* — Jeffry H Aftergut
*Assistant Examiner* — Jaeyun Lee
(74) *Attorney, Agent, or Firm* — Patterson Thuente Pedersen, P.A.

(57) ABSTRACT

A method for manufacturing a double-walled tube is provided. The method comprises the extrusion of two tubes wherein one tube is inside the other. A first mold is provided around the outside of the outer tube and a support provided along the inside of the inner tube. Fluid is then injected into the cavity between the inner and outer tubes to mold the outer tube against the first mold.

9 Claims, 4 Drawing Sheets

(51) Int. Cl.
    *B29C 48/09*     (2019.01)
    *F28F 21/06*     (2006.01)
    *F28D 7/10*     (2006.01)
    *F28D 20/02*     (2006.01)

(52) U.S. Cl.
    CPC ........... *F28D 20/02* (2013.01); *F28D 20/028* (2013.01); *F28F 21/062* (2013.01); *Y02E 60/145* (2013.01)

(56) References Cited

U.S. PATENT DOCUMENTS

| | | | |
|---|---|---|---|
| 5,285,798 A | 2/1994 | Banerjee | |
| 2003/0030189 A1 | 2/2003 | Wang | |
| 2011/0186169 A1* | 8/2011 | Pionetti | F16L 1/18 138/114 |
| 2015/0223520 A1 | 8/2015 | Phillips | |
| 2016/0146506 A1 | 5/2016 | Brereton | |
| 2016/0168438 A1 | 6/2016 | Harding | |
| 2017/0013876 A1 | 1/2017 | Schennum | |

FOREIGN PATENT DOCUMENTS

| | | |
|---|---|---|
| CN | 104093542 | 10/2014 |
| EP | 0209399 A2 | 1/1987 |
| EP | 2251186 | 11/2010 |
| WO | WO 03/013826 A2 | 2/2003 |
| WO | WO 2014/045025 | 3/2014 |
| WO | WO 2014045024 A2 | 3/2014 |

OTHER PUBLICATIONS

International Search Report, Application No. PCT/EP2015/074394, dated Feb. 12, 2016, 6 pages.
International Preliminary Report on Patentability, Application No. PCT/EP2015/074394, dated Jan. 27, 2017, 8 pages.
Written Opinion of International Searching Authority, Application No. PCT/EP2015/074394, dated Feb. 12, 2016, 7 pages.
Japanese Office Action, Application No. 2017-522116, dated May 29, 2018, 8 pages (11 pages with translation).
Chinese Office Action, Application No. 201580057479.5, dated Sep. 4, 2018, 21 pages.
Chinese Office Action, Application No. 2015800574795, dated Dec. 31, 2019, 14 pages.

* cited by examiner

METHODS OF MANUFACTURING A DOUBLE-WALLED TUBE

CROSS-REFERENCE TO RELATED APPLICATIONS

The present application is a National Phase entry of PCT Application No. PCT/EP2015/074394, filed Oct. 21, 2015, which claims priority from GB Patent Application No. 1418771.0, filed Oct. 22, 2014, each of which is hereby fully incorporated herein by reference.

FIELD

The disclosure relates to methods for manufacturing a double-walled tube, which may, for example, be used as a heating tube in a device for heating smokeable material.

BACKGROUND

The manufacture of multiple walled containers such as double-walled tubes usually requires a number of manufacturing steps. Conventionally, inner and outer tubes are molded separately and then combined and sealed together, prior to filling of one or more of a plurality of the chambers, if applicable.

SUMMARY

In accordance with some embodiments described herein, there is provided a method for manufacturing a double-walled tube, wherein the method comprises: a) forming two extruded tubes, wherein one tube is arranged inside the other; b) providing a first mold around the outside of the outer tube and a support along the inside of the inner tube; and, c) injecting fluid into a first cavity between the inner and outer tubes to mold the outer tube against the first mold; and wherein at least some of the fluid is retained in the cavity between the inner and outer tubes and wherein the fluid is, or comprises a component of, a substance that can be activated to act as a heat source or a coolant.

The fluid may be a phase change material.

The phase change material may comprise sodium acetate trihydrate.

The method may further comprise forming an aperture in the molded double-walled tube and injecting the fluid into the first cavity through the aperture.

An actuating means for activating the substance to act as a heat source or a coolant may be attached to the heating tube in the region of the aperture.

The double-walled tube may be a heating tube or a cooling tube for use in a device for heating or cooling a material to be heated or cooled, and a second cavity may be defined by the inner tube for receiving the material to be heated or cooled.

The double-walled tube may be a heating tube and the substance can be activated to act as a heat source, and the method may further comprise providing a smokeable material in the second cavity.

In accordance with some embodiments described herein, there is also provided a method for manufacturing a double-walled tube, the method comprising: forming two extruded tubes, wherein an inner extruded tube is arranged inside an outer extruded tube; and applying a vacuum to a cavity between the outer extruded tube and a mold so as to vacuum mold the outer extruded tube against the mold.

The method may further comprise: inserting a substance that can be activated to act as a heat source or as a coolant into a cavity between the inner extruded tube and the outer extruded tube.

The substance may be a fluid.

The substance may be a phase change material.

The phase change material may comprise sodium acetate trihydrate.

The method may further comprise sealing the inner extruded tube to the outer extruded tube to define a first end of the double-walled tube prior to inserting the substance into the cavity between the inner extruded tube and the outer extruded tube.

The method may further comprise sealing the inner extruded tube to the outer extruded tube to define a second end of the double-walled tube after inserting the substance into the cavity between the inner extruded tube and the outer extruded tube.

The method may further comprise cutting through the first and second ends to release waste material from the double-walled tube.

The method may further comprise attaching to the double-walled tube an actuating means for actuating the substance.

The method may further comprise: pressurizing the longitudinal cavity of the inner extruded tube with fluid when the substance is being inserted into the cavity between the inner extruded tube and the outer extruded tube.

The method may further comprise: supporting the inner extruded tube on a support inserted through the longitudinal cavity of the inner extruded tube when the substance is being inserted into the cavity between the inner extruded tube and the outer extruded tube.

The method may further comprise inserting a smokeable material into the longitudinal cavity of the inner extruded tube.

In accordance with some embodiments described herein, there is also provided a heating tube for use in a device for heating smokeable material, wherein the heating tube is obtained or obtainable by any of the above defined methods.

BRIEF DESCRIPTION OF THE DRAWINGS

Embodiments will now be described, by way of example only, with reference to the accompanying drawings, in which.

DETAILED DESCRIPTION

The application relates to a method for manufacturing a double-walled tube which may, for example, be used as a heating tube for use in a device for heating smokeable material.

Figure 1:
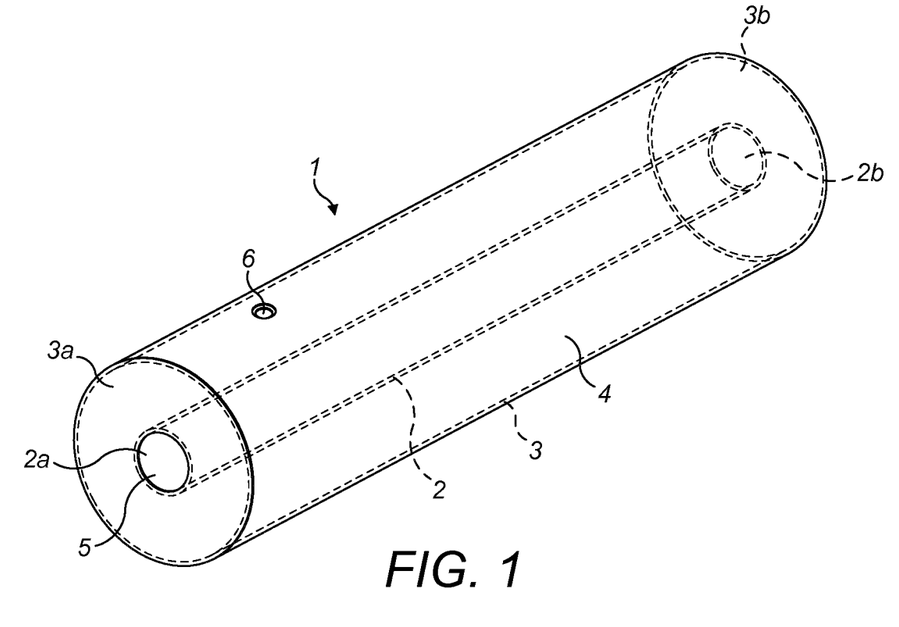
FIG. 1 shows a double-walled tube.

FIG. 1 shows an example of a double-walled tube 1. The double-walled tube 1 comprises an inner cylindrical tube 2 and an outer cylindrical tube 3. The inner cylindrical tube 2 and the outer cylindrical tube 3 are arranged concentrically with the inner cylindrical tube 2 within the outer cylindrical tube 3. The outer cylindrical tube 3 comprises a pair of annular ends 3a and 3b and the inner cylindrical tube 2 is open at both ends 2a, 2b. An enclosed annular space 4 is thus defined between the inner and outer cylindrical tubes 2, 3.

The inner cylindrical tube 2 defines a cylindrical cavity 5 that extends along the central longitudinal axis of the double-walled tube 1.

Figure 2:
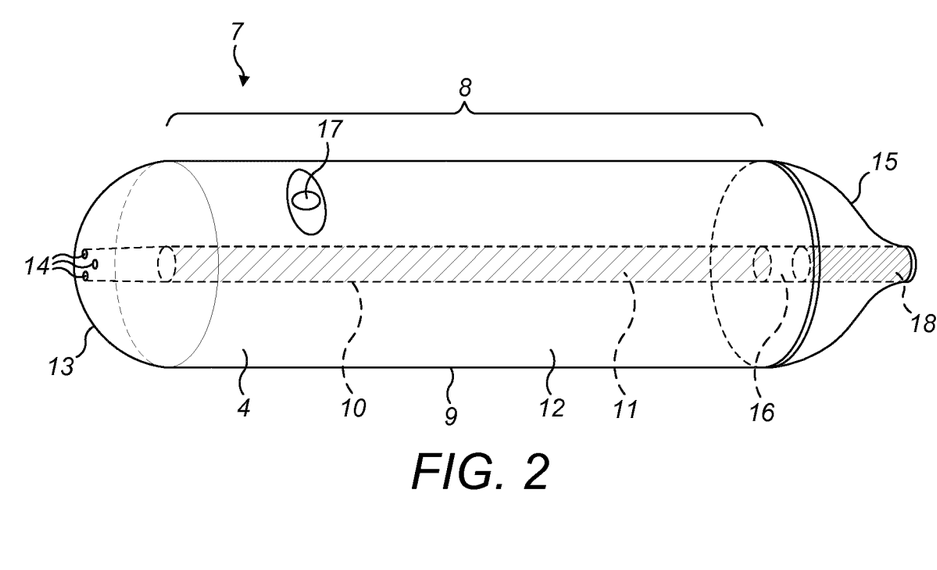
FIG. 2 shows a device comprising a double-walled tube.

FIG. 2 is a schematic illustration of a device 7 that comprises a double-walled tube similar to the one illustrated in FIG. 1. The device 7 is a smoking article that is configured to heat smokeable material.

In use, smoking articles, such as cigarettes and cigars, burn smokeable material, such as tobacco, to create smoke. Attempts have been made to provide alternatives to these smoking articles by creating products which release compounds without creating smoke. Examples of such products are so-called "Tobacco Heating Device" products which release compounds by heating, but not burning, smokeable material.

The device 7 shown in FIG. 2 is configured to heat smokeable material without burning it. As used herein, the term "smokeable material" includes any material that provides volatilized components upon heating. In some embodiments, it includes any tobacco-containing material and may, for example, include one or more of tobacco, tobacco extracts, tobacco derivatives, treated or modified tobacco such as expanded tobacco and reconstituted tobacco, or tobacco substitutes. For the avoidance of doubt, when devices such as that shown in FIG. 2 are in use, the smokeable material will not be combusted and will not generate smoke.

The device 7 shown in FIG. 2 comprises a double-walled tube 8 similar to that shown in FIG. 1 which is employed as a heating tube for heating smokeable material. In the double-walled heating tube 8 of the device 7, the annular space 4 defines a heat source chamber 9, and the central longitudinal cavity 5 defines a heating chamber 10.

The heating chamber 10 is configured to receive smokeable material 11 so that the smokeable material 11 can be heated in the heating chamber 10.

The heat source chamber 9 is for containing a heat source 12. The heat source 12 is activatable on demand to provide heat.

For example, the heat source 12 may comprise a phase change material which provides heat when it is induced to change between physical states (for example, from liquid to solid). Suitable phase change materials include hydrated salt phase change materials, comprising hydrated salts such as sodium acetate trihydrate, sodium hydroxide monohydrate, barium hydroxide octahydrate, magnesium nitrate hexahydrate and magnesium chloride hexahydrate.

Sodium acetate trihydrate is stable at room temperature and is non-hazardous. The phase change of sodium acetate trihydrate from liquid to solid can also be reliably and quickly initiated by a variety of activating agents at least some of which can be incorporated into a separate actuator chamber, and transferred into contact with the phase change material to activate the heat source as required.

The heat source 12 may also comprise a plurality of reagents which are capable of reacting exothermically. The heat source 12 may comprise an exothermic chemical reaction between two or more reagents. The exothermic reaction may be a water-activated reaction, wherein water, or an aqueous solution or suspension, is added to one or more reagents in order to initiate an exothermic chemical reaction.

Reagents which may be used in combination with water to cause a water-based exothermic chemical reaction include calcium oxide (CaO), sodium hydroxide (NaOH), calcium chloride ($CaCl_2$) and magnesium sulphate ($MgSO_4$). In some embodiments, these reagents are provided in solid form, for example in the form of a powder, granules, pellets or chunks, although they may also be used in other forms. These materials may be provided in a dedicated actuator, or otherwise transferred into contact with the water or aqueous solution to activate the heat source as required.

In other embodiments, the exothermic reaction may be a reaction between two or more reagents, none of which is water. For example, the exothermic reaction may include an organic liquid such as acetic acid.

Any one or a combination of the heat sources discussed above may be employed as a heat source 12 in devices of the type shown in FIG. 2.

The heating tube 8 is configured such that the heat source 12 is able to heat the heating chamber 10 sufficiently to volatilize constituents of the smokeable material 11 without burning the smokeable material 11. Generally, and in the example shown in FIG. 2, the heating tube 8 is configured such that the heating chamber 10 is located adjacent to the heat source chamber 9. Thus, in use, thermal energy from the heat source 12 heats the heating chamber 10.

In the example shown in FIG. 2, the heat source chamber 9 and heating chamber 10 comprise co-axial layers within the heating tube 8, wherein the heating chamber 10 is located within the central longitudinal cavity of the heat source chamber 9. By means of this arrangement, efficient transfer of heat is provided from the heat source chamber 9 to the heating chamber 10.

The device 7 further comprises at one end of the heating tube 8 an end cap 13 comprising air conduits 14. A mouthpiece 15 is arranged at the other end of the heating tube 8. The annular mouthpiece 15 comprises an opening which provides a passageway 16 for fluid communication between the smokeable material 11 in the heating chamber 10 and the exterior of the device 7. An actuator 17 is provided on the outer circumferential surface of the heating tube 8.

The actuator 17, examples of which are discussed in more detail below, comprises means to trigger the heating of heat source 12 to increase the temperature of the heating chamber 10. Accordingly, to initiate use of the device 7, the user activates the actuator 17 to heat the smokeable material 11. The user is then able to use the device 7 by drawing on the mouthpiece 15. External air is thus drawn via the air conduits 14 through the smokeable material 11 in the heating chamber 10 and then into the user's mouth via the passageway 16 in the mouthpiece 15. In this way, substances produced upon heating the smokeable material 11, such as nicotine and aroma vapors, may become entrained in the gaseous flow as it is drawn by the user.

The type of actuator 17 used with the heating tube 8 may be selected on the basis of the type of heat source used.

The actuator 17 may, for example, comprise an injection molded unit or a thermoformed unit or a vacuum-formed unit and may be attached to the heating tube 8 by any suitable means including an interference fit and/or a suitable adhesive, welding, heat-sealing and the like. The actuator 17 may comprise a button or other means to activate the heat source 12.

For example, when the heat source comprises a phase change material, the actuator 17 may be configured to provide a nucleation point to trigger crystallization of the phase change material. This may involve contacting the phase change material with a seed crystal to trigger the phase change. Alternatively, the phase change may be triggered by a sharp point or clicker providing the nucleation.

In some embodiments, activation of the actuator 17 may result in the mixing of reactants with an activating agent. For example, calcium oxide (CaO) in particulate solid form (e.g. in the form of powder and/or chunks), may be added to water or an aqueous solution in the heat source chamber 9 to provide an exothermic reaction.

The actuator 17 may comprise a rupturable element which may be ruptured upon activation of the actuator 17 to thereby activate the heat source 12. Sealing the heat source chamber 9 by attaching an actuator comprising a rupturable barrier to the surface of the heating tube 8 has the advantage that the heating tube 8 including the heat source 12 and actuator 17 may be formed and supplied as a separate component and therefore easily assembled with the other components of the device 7. Moreover, this separate component can be formed in just two operations, a first step in which the heat source 12 is used as a fluid pressure medium to blow mold the heating tube 8 as will be described in a first example below, and a second step in which the actuator 17 is connected.

The mouthpiece 15 may comprise a filter 18. The filter 18 may include filtration material, which may be any material capable of binding and/or removing one or more substances derived from the heating of the smokeable material 11. For example, the filter 18 may comprise cellulose acetate tow.

The heating tube 8 is thus conveniently arranged such that the heat source 12 or heat source chamber 9 is not in fluid communication with the passageway 16 in the mouthpiece 15. Thus, any gases evolved by the heat source 12 cannot be inhaled by the user.

Indeed, by means of the double-wall arrangement, the heating tube 8 is configured to prevent any contact between the heat source 12 and the smokeable material 11.

The double-wall arrangement of the heating tube 8 may also advantageously allow heat generated by the heat source 12 in the heat source chamber 9 to be efficiently transmitted to the heating chamber 10. For example, the heating tube 8, or a portion thereof, may be configured to be thermally conductive.

Moreover, the heating tube 8 may also conveniently be configured to be sufficiently thermally stable to withstand the temperature generated by the heat source 12. The heating tube 8 may also be configured to be insulated to prevent the user from being burned by the heat source 12.

The heating tube 8 may also be sufficiently structurally resilient to provide support for the other components of the device 7 and to be sufficiently robust to withstand handling and use by the user.

In some examples, in which the heat source 12 comprises a phase change material, the heating tube 8 may be composed of a transparent material to enable the user to view the contents of the heating tube 8.

In general, the heating tube 8 may be composed of any gas impermeable, thermally stable, and thermally conductive material, such as those listed. In embodiments, the heating tube 2 comprises a thermoplastic polymer resin, such as PET.

In a device of the type shown in FIG. 2, the length of the heating tube 8 may be approximately 130 mm, and the diameter may be, for example, approximately 7-8 mm, or approximately 15-18 mm. The diameter may be the same at each end of the heating tube 8, or may vary along its length. For example, the heating tube 8 may be shaped for decorative or ergonomic purposes, or to provide a suitable shape for interference fit of the mouthpiece 15, end cap 13, actuator 17, or other attachment.

The double-walled tube 1 shown in FIG. 1 comprises transverse, planar end walls. However, the ends of the double-walled tube may have any suitable shape or configuration as appropriate. In some examples, one end of the double-walled heating tube 8 may be shaped to provide the mouthpiece 15 so that a separate mouthpiece, such as an injection molded mouthpiece section, is not required. In the same or other examples, one end of the heating tube 8 may be shaped to provide an end cap 13 so that a separate end cap, such as an injection molded end cap, is not required.

First Example of a Method of Manufacturing a Double-Walled Tube

There will now be described a first example of a method of manufacturing a double-walled tube such as the one illustrated in FIG. 1.

In a first step, two open tubes are extruded from an extruder head of an extruder. The extrusion is configured to generate two tubes wherein a first, larger, outer tube is located around and spaced from the outer circumferential surface of a second, smaller, inner tube. An annular space is defined between the two extruded tubes. The inner extruded tube will ultimately form the inner cylindrical tube 2 of the finished double-walled tube 1 and the outer extruded tube will ultimately form the outer cylindrical tube 3.

The extruder may, for example, comprise two annular extrusion ports for extruding concentric tubular moldable extrusions, wherein one annular extrusion port is positioned within the other.

As an alternative to the use of annular extrusion ports, one or a plurality of sheets may be extruded, with the one or more sheet extrusions being subsequently sealed together to form one or both of the extruded tubes. For example, split mold segments may be used to seal the extrusions.

The inner and outer extruded tubes may be extruded simultaneously. Alternatively, one of the extruded tubes may be extruded prior to extrusion of the other. For example, the inner extruded tube may be extruded into the core of a pre-extruded outer tube, or alternatively, an outer tube or one or more moldable sheet extrusions may be extruded around a pre-extruded inner tube.

The extruded material, preferably a thermoplastic material, may be supplied by one or a plurality of extruders. The one or more extruders may have a screw feed or piston.

A continuous or intermittent extrusion process may be used. An intermittent process in which the plastics material is not constantly extruded may conveniently allow sufficient time to complete a cycle of positioning, mold closing, blow molding, and ejection steps. By way of an example, an accumulating head extruder may be suitable for use in this method, in which the extrudable material accumulates in a piston arrangement when extrusion is interrupted.

Alternatively, a continuous extrusion process may be used to form the extruded tubes, together with a means for cutting and transporting the extruded tubes away from the extruder head to be molded elsewhere. This arrangement may provide the advantage of extrusion and molding processes being performed simultaneously.

Tube cutting means may be provided and arranged to cleave the extruded tubes close to the extrusion port.

Any suitable thermoplastics material may be used to form the double-walled tube 1. Suitable thermoplastic materials include polyethylene terephthalate (PET), polyethylene (PE), poly(vinyl chloride) (PVC), polyproylene and polycarbonate (PC).

One or both of the extruded tubes may comprise one or more co-extrusion layers. Accordingly, one or both extruded tubes may comprise a single or multiple layers. Either tube may comprises a layer, for example, an outer layer that comprises a material that acts as a moisture barrier to prevent or resist moisture passing through that layer.

In addition, or alternatively, one or both of the tubes may be extruded with decorative strips or a plurality of differently colored segments.

These effects may be achieved by means of a plurality of extruders, each extruding a material with a different composition. According to this arrangement, the extruders may be connected to a common extruder head, configured such that a tube extruded in one or more layers or sections emerges from the exit nozzle (an exit nozzle is often referred to in the art as a "die and pin"). The extruded tubes are subsequently transferred to a blow molding tool arrangement which comprises a first, outer mold and a second, inner mold.

The first outer mold may be a split mold, comprising a plurality of blow mold sections, which are configured to close around the outer extruded tube. Generally, the first mold comprises two sections that are substantially similar in size and shape.

The first mold is an external mold and has an internal surface for defining an outer surface of the outer extruded tube which will ultimately form the outer cylindrical tube 3 of the double-walled tube 1. In the case of the double-walled tube 1 shown in FIG. 1, the double-walled tube 1, and thus the cavity within the first mold, is substantially cylindrical.

The second mold has the form of a mandrel and is inserted into the mold cavity down the center of the inner extruded tube. The second mold functions to support the innermost longitudinal surface of the inner extruded tube, which will ultimately form the inner cylindrical tube 2 of the double-walled tube 1. The mandrel also serves to support the inner extruded tube during the molding process. In the embodiment shown in FIG. 1, the inner surface of inner cylindrical tube 2, and thus the outer surface of the second mold, is substantially cylindrical. The inner mold may extend along the entire length of the extruded tubes.

In addition to maintaining the shape of the inner surface of the inner extruded tube, the inner mold also supports the inner extruded tube during the blow molding process.

The inner mold may comprise a plurality of sections. For example, the inner mold may be made up of two mandrels which extend into the mold cavity from either end and contact one another near the center. The use of an inner mold comprising a plurality of separable sections may assist in the removal of the inner mold from the finished heating tube.

In use, the sections of the first mold are brought together around the extruded tubes and the second mold is inserted longitudinally along the central core of the inner extruded tube.

When positioned for molding, a portion of the first mold may form a seal with a portion of the second mold. In this way, one or both of the first and second molds may comprise the tube cutting means. In addition, the molds may be used to join the inner and outer extruded tubes at one or both ends, and thereby used as blow molds to define and shape one or both ends of the double-walled tube 1.

The inner and outer extruded tubes may be joined at one or both ends by any suitable means, for example, by using a friction welding technique such as spin welding, by laser welding, by ultrasonic welding or by gluing.

The molds may be formed from any suitable material, such as for example, a metal.

The molds may comprise means for controlling the temperature of the thermoplastic material.

The blow molding tool arrangement comprises means for injecting fluid into the annular cavity between the first and second extruded tubes to thereby inflate the cavity and shape the thermoplastic material against the inner and outer molds to form the double-walled tube 1.

The fluid pressure medium may include a gas such as air.

Alternatively, the fluid pressure medium may be a liquid. Any suitable liquid may be used.

As explained above, in some embodiments, the double walled tube 1 may be configured for use as a heating tube wherein the annular space 4 defined between the inner and outer tubes 2, 3 may be configured to comprise a heat source 12, arranged to heat the central longitudinal cavity 5 of the double-walled tube 1. In this case, a component of the heat source 12, which may be a liquid component, may advantageously be used as the fluid pressure medium. In this way, the blow molding of the double-walled tube 1 and filling of the annular space 4 with the heat source 6 may be performed simultaneously.

In some examples, the heat source 12 may comprise a phase change material, which releases heat upon changing physical states, for example in the transition from the liquid to the solid state. In this case, the fluid pressure medium may comprise a component or all of the phase change material.

The exact formulation of the phase change material may affect the temperature generated and also the suitability of the material for use as the fluid pressure medium. For example, where the phase change material comprises sodium acetate trihydrate, it has been found that the higher the water content of the formulation, the lower the temperature that may be achieved by the phase change. In addition, the formulation may improve stability of the phase change material in the liquid state, and may also increase the shelf life of the phase change heat source 12, whether already associated with the device or as a separate product to be associated with the device prior to use.

Phase change materials may be particularly suitable for use as the fluid pressure medium because the conditions of elevated temperature and pressure under which the fluid pressure medium is used have been found to be particularly helpful in preventing seeding and premature activation of the phase change material. In contrast, if the phase change material is used under these same conditions of elevated temperature and pressure to fill a pre-molded double-walled tube, then the plastic can be caused to soften and deform. However, these effects do not cause a problem during the molding of the double-walled tube, and indeed, may assist in shaping the thermoplastic material into the molds. On the other hand, if a phase change material at a sub-optimal temperature and pressure is used to fill a pre-molded double-walled tube then the risk of premature activation of the phase change material may be increased.

In examples in which the heat source 12 comprises a water-activated reaction, the fluid pressure medium may comprise water or an aqueous solution.

In examples in which the heat source comprises a reaction between two or more reagents, none of which is water, one of the reagents may be used as the fluid pressure medium.

The fluid pressure medium is introduced into the annular cavity between the inner and outer extruded tubes to blow mold the outer extruded tube against the outer mold, and the inner extruded tube against the inner mold to thereby form the double-walled tube 1.

In examples in which the fluid pressure medium includes at least a component of the phase change material, the two extruded tubes may first be sealed together at one end, prior to the fluid pressure medium being blown into the annular cavity between the two extruded tubes from the other end of the extruded tubes. The extruded tubes may then be sealed at the other end to seal the phase change material in the annular cavity.

The fluid pressure medium may be injected into the annular cavity between the two extruded tubes by any suitable means and at any suitable position. For example, the fluid may be injected by means of one or a plurality of modified blow mandrels or blow pins.

Each of the blow molds and blow mold segments may be configured to accommodate the one or more blow pins when the molds are in the closed configuration. One or more of the pins may be retractable to assist assembly or removal of one or more of the molds or mold sections.

Conveniently, one or a plurality of blow pins for blow molding the double-walled tube 1 may enter the annular cavity via the gap between the two extruded tubes at one or both of the ends of the heating tube.

Alternatively, the blow pin or pins may enter the annular cavity between the two extruded tubes at a position along one or both of the longitudinal cylindrical surfaces of the inner and/or outer extruded tubes.

Injecting into the longitudinal surface of the extruded tubes may advantageously allow the ends of the double-walled tube 1 to be shaped during the blow molding process.

Removal of the one or more blow pins may leave one or more apertures 6 (see FIG. 1) in the surface of the double-walled tube 1. The one or more apertures 6 may be subsequently sealed in an appropriate manner. For example, the aperture or apertures may be sealed by means of a plug or cap, bonded by means of a suitable adhesive or heat welding process.

Prior to sealing, however, the one or more apertures 6 may be used to fill the annular space 4 defined between the internal and external cylindrical walls 2, 3 if appropriate. For example, in embodiments in which the double-walled tube 1 is configured for use as a heating tube, the heat source may be inserted into the annular space 4 by means of the one or more apertures 6. This may be particularly applicable if the fluid pressure medium does not constitute the heat source, or all of the components of the heat source.

In addition, or alternatively, one or more of the apertures 6 may be used to locate an actuator. For example, in embodiments in which the double-walled tube 1 is configured for use as a heating tube, an actuator configured to activate the heat source may be connected to one or more of the apertures 6 to thereby contact the heat source within the annular space 4.

In embodiments of the device 7 of the type shown in FIG. 2, in which the blow pins enter the annular space 4 close to one or both of the ends of the double-walled heating tube 8 the remaining apertures may be covered by means of the mouthpiece 15 or end cap 13.

After blow molding has been completed, and the double-walled tube 1 has cooled sufficiently, the sections of the inner and outer molds are removed.

The shape of the inner mold may be limited by the need to be able to readily extract the mold following formation of the double-walled tube 1. The use of an inner mold comprising a plurality of separate sections may assist in the removal of the mold from the finished double-walled tube 1.

To assist in removal of the molds from the double-walled tube, the blow molding tool arrangement may further comprise ejectors. The ejectors may comprise ejection pistons or air valves or "popper valves" in which air pressure is used as an ejection means. Each blow mold and blow mold section may comprise one or plurality of ejectors. The ejectors may be located in the peripheral regions of the blow molding tool arrangement and thereby act on one end of the molded double-walled tube. For example, the ejectors may act on a region of the double-walled tube that that is intended to subsequently be covered by further components, such as, for example, an end cap, actuator, or a mouthpiece, in case the ejectors leave impressions in the wall of the not yet completely cured plastic. Impressions left by the ejectors may adversely influence the appearance of the double-walled tube 1, and, depending on their severity, may lead to structural weakening of the double-walled tube.

Depending on the material used to form the heating tube, it may be necessary to include the additional step of curing the polymer.

Second Example of a Method of Manufacturing a Double-Walled Tube

There will now be described a second example of a method of manufacturing a double walled tube 1 such as the one shown in FIG. 1.

Referring now first to FIGS. 3a to 3f there is illustrated schematically an apparatus for performing steps in a second example of a manufacturing process of a double-walled tube.

The apparatus comprises a mold 200 comprising a first mold section 200a and a second mold section 200b. The first mold section 200a and the second mold section 200b face each other and define a first mold opening 200c at a first end of the mold 200 and a second mold opening 200d at a second end of the mold 200. The apparatus further comprises an extruding device comprising an extruding head 202 which faces the first mold opening 200c. The extruding head 202 comprises concentric outer 202a and inner 202b annular extrusion ports.

Figure 3A:
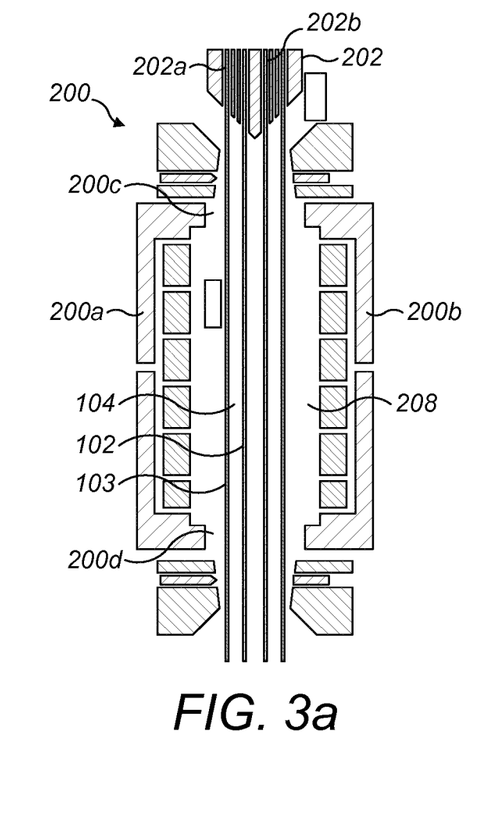
FIGS. 3a to 3f illustrate schematically steps in the manufacturing of a double walled tube.

In a first step, illustrated in FIG. 3a, the first mold section 200a and the second mold section 200b are in an open configuration and the extruding head 202 is arranged to extrude an inner extruded tube 102 and an outer extruded tube 103 into a mold cavity 208 defined by the first mold section 200a and the second mold section 200b. The outer extruded tube 103 is extruded from the outer extrusion port 202a and the inner extruded tube 102 is extruded from the inner extrusion port 202b and both extend into the first mold opening 200c, through the mold cavity 208 and out of the second mold opening 200d. The inner extruded tube 102 is arranged co-axially in the outer extruded tube 103 so that an annular tube cavity 104 is defined between the two.

The inner extruded tube 102 and an outer extruded tube 103 may comprise, for example, any of the thermo-plastic materials described above with respect to the first example.

Figure 3B:
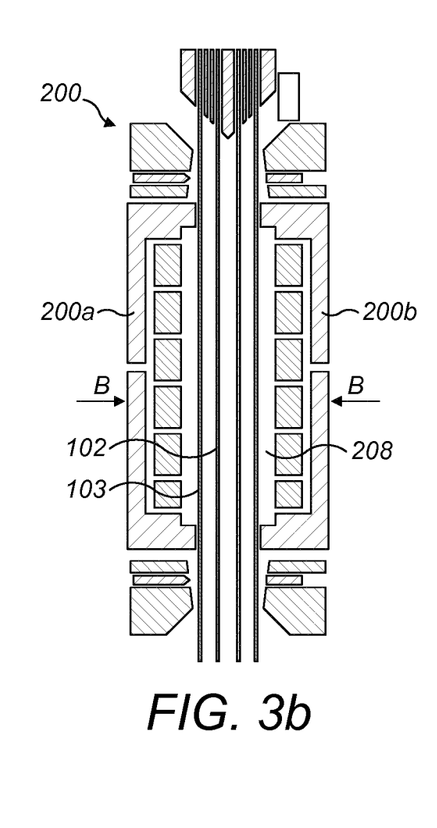

In a second step, illustrated in FIG. 3b, the first mold section 200a and the second mold section 200b are moved towards one another (as indicated by the Arrows B) into a closed configuration in which the mold 200 is closed around the outer extruded tube 103 and the inner extruded tube 102 so that the mold cavity 208 is substantially sealed off at the first and second ends.

Figure 3C:
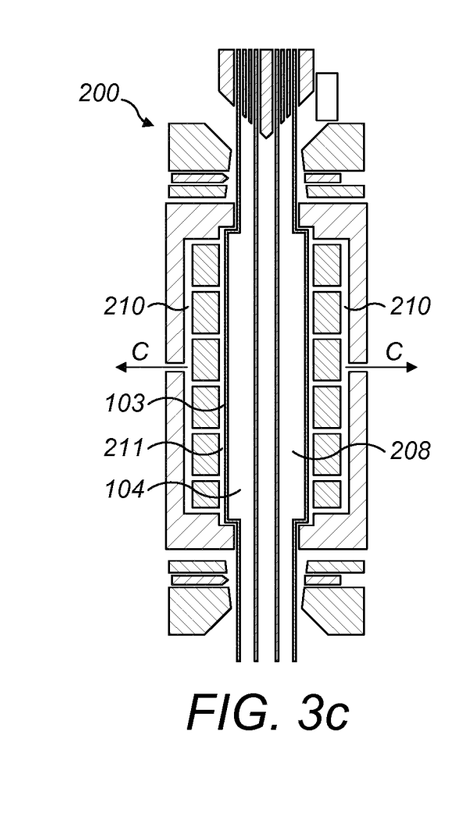

In a third step, illustrated in FIG. 3c, vacuum generating apparatus (not shown), for example, a vacuum pump, applies a vacuum to the mold cavity 208 by drawing air out of the mold cavity 208 (as indicated by the Arrows C) via an arrangement of venting channels 210 which connect the mold cavity 208 to the exterior of the mold 200. The vacuum applied to the mold cavity 208 results in a pressure differential being generated across the outer extruded tube 103 between the annular tube cavity 107 and the mold cavity 208 (the pressure in the annular tube cavity 107 is higher than that in the mold cavity 208) which causes the outer extruded tube 103, within the mold cavity 208, to be molded against an inner surface 211 of the mold 200.

Figure 3D:
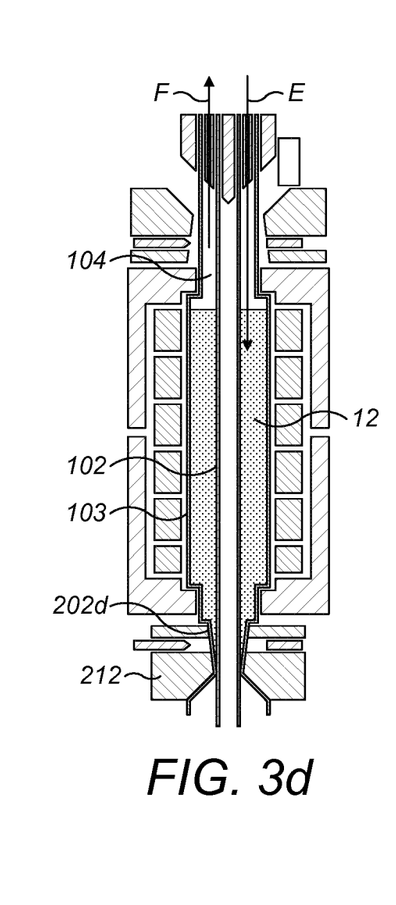

In a fourth step, illustrated in FIG. 3d, a first bonding tool 212 bonds together the outer extruded tube 103 and the inner extruded tube 102 in the vicinity of the second mold opening 200d so as to close off the annular tube cavity 104 at one end. This bonding may be achieved in any one of a number of ways, for example, by using a friction welding technique such as spin welding, by laser welding, by ultrasonic welding, by gluing or by using residual heat from the extrusion process itself.

In a fifth step, also illustrated in FIG. 3d, a heat source, e.g. a material that can be activated to provide heat 12 is filled into the annular tube cavity 104 through an open end of the annular tube cavity 104 as indicated by the arrow E. In one example, filling the annular tube cavity 104 with the material for providing heat 12 causes air to be vented from the annular tube cavity 104 as indicated by the arrow F. In a further example, air may be vented from the annular tube cavity 104 prior to filing it with the material for providing heat 12.

When the annular tube cavity 104 is being filled with material for providing heat 12, the inner extruded tube 102 may be supported so as to prevent pressure changes causing unwanted deformation of the inner extruded tube 102. For example, the inner extruded tube 102 may be supported by being filled with pressurized fluid, for example air. Alternatively, the inner extruded tube 102 may be supported by a support member, for example, a mandrel inserted into the longitudinal cavity of the inner extruded tube 102.

As described above with respect to the first example of manufacturing a double walled tool, the material for providing heat 12 may be a phase change material that releases heat upon changing physical states. Accordingly, the material for providing heat 12 that is filled into the annular tube cavity 104 may be a liquid that generates heat if a phase change to the solid state is induced. Examples of suitable materials, for example, hydrated salts, have been given previously.

Figure 3E:
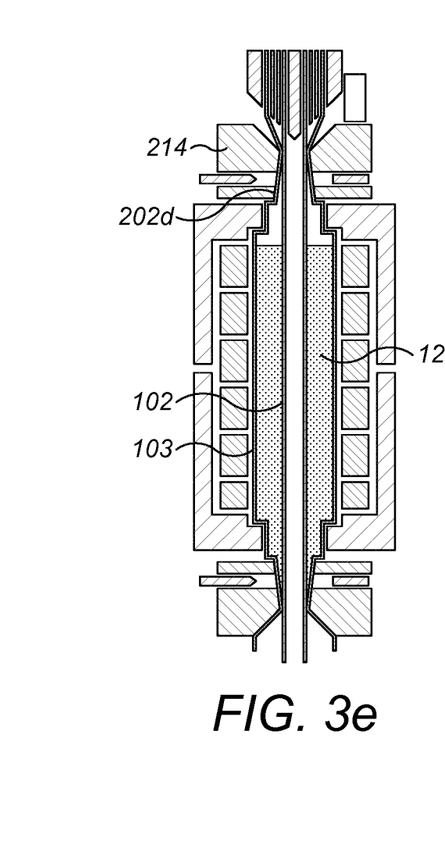

In a sixth step, illustrated in FIG. 3e, a second bonding tool 214 bonds together the outer extruded tube 103 and the inner extruded tube 102 in the vicinity of the first mold opening 200d so as to close off the annular tube cavity 104 at a second end so that the annular tube cavity 107 is closed at both the first end and the second end and the material for providing heat 112 is sealed in the annular tube cavity 107. This bonding may be achieved using any of the techniques described above with respect to the fourth step.

Figure 3F:
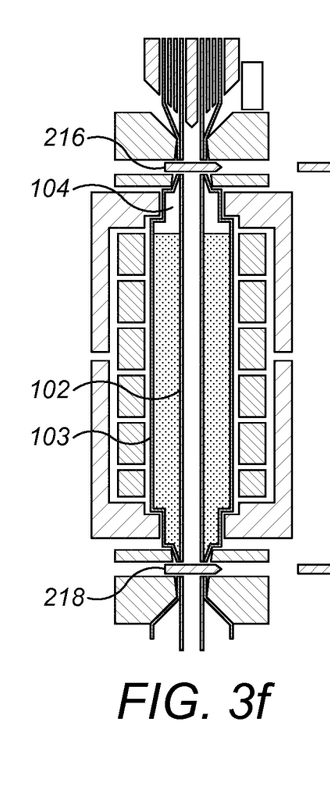

In a seventh step, illustrated in FIG. 3f, first 216 and second 218 cutters are used to cut through the outer extruded tube 103 and the inner extruded tube 103 at the first and second ends respectively in order to remove waste tubing from each end. The cuts are made through regions at which the outer extruded tube 103 and the inner extruded tube 102 are bonded together and leave the inner extruded tube 102 open at both ends.

This seventh step results in a double walled tube similar to that described with respect to FIG. 1 (although prefilled with a material for providing heat 12) which is then ejected from the mold 200.

Each of one or more of the manufacturing steps described with respect to FIGS. 3a to 3f may be implemented by a different stage of a Rotary Wheel production apparatus (not shown) with the Rotary Wheel rotating to move a double walled tube that is being manufactured from one stage to the next. In this way, the Rotary Wheel production apparatus may handle the manufacturing of multiple double walled tubes simultaneously, with each of the double walled tubes in the machine at a given time being at a different stage of manufacture. This arrangement may facilitate providing a high output of double walled tubes.

Referring now to FIGS. 4a to 4e, there are schematically illustrated steps by which such a double walled tube 1 is used as the starting point to assemble or manufacture a device 7 similar to that described above with respect to FIG. 2.

Figure 4A:
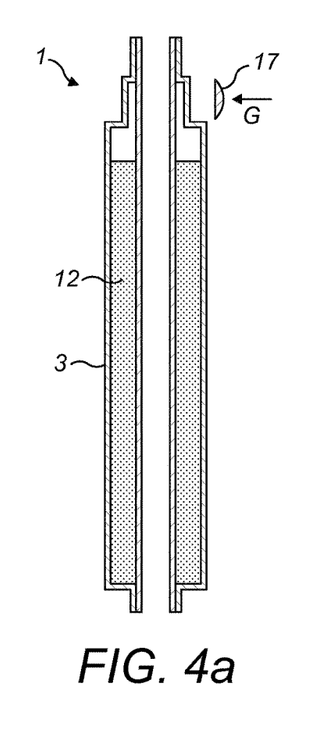
FIGS. 4a to 4e illustrate schematically steps in the manufacturing of a device comprising a double walled tube.

In a first step, illustrated in FIG. 4a, an actuator 17 for actuating the material for providing heat 12 is attached, as indicated by the arrow G, to an outer tube 3. As explained with reference to FIG. 2 above, the exact nature of the actuator 17 will depend upon the nature of the material for providing heat 12.

In some examples, the region of the outer tube 103 to which the actuator 17 is attached is thinner than the remainder of the outer tube 103. This is advantageous if the actuator 17 comprises a component, for example, a sharp point, that must penetrate through the outer tube 103, when the actuator is actuated, in order to initiate a process for causing a phase change of the material 12. The thickness of this region may be controlled by suitably moving a die and pin in the extrusion head during the extrusion process (this is referred to in the art as 'wall thickness control') or by creating a secondary draw area in the mold cavity.

Figure 4B:
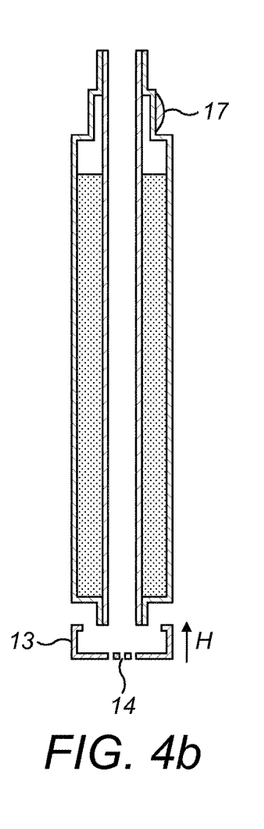

In a second step, illustrated in FIG. 4b, a vent cap 13 is attached as indicated by the arrow H, for example by snap fitting, to a second end of the double walled tube 1.

Figure 4C:
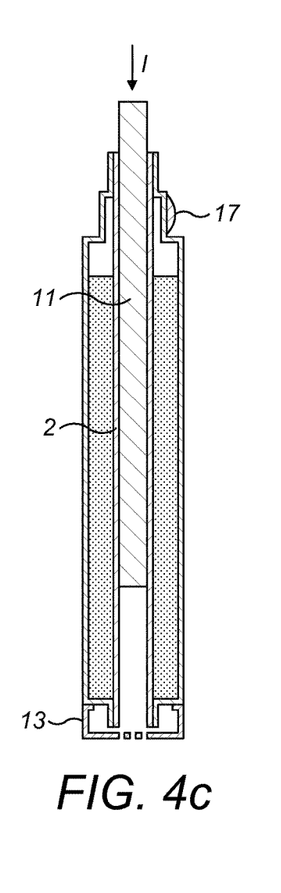

In a third step, illustrated in FIG. 4c, a smokeable material 11 is inserted, as indicated by the arrow I, for example, pushed into the longitudinal cavity of the inner tube 2 through its open end. The smoking material 11 may take any of the forms described above.

Figure 4D:
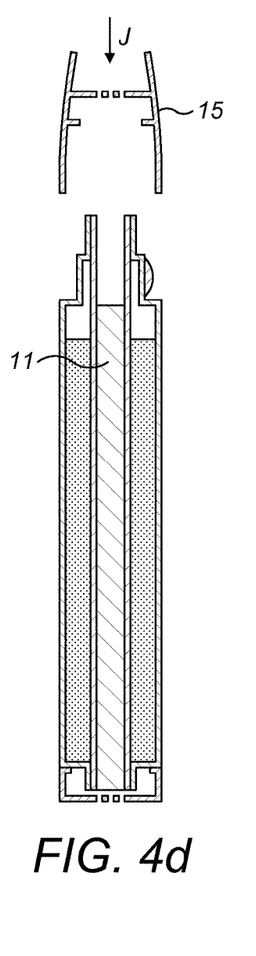
Figure 4E:
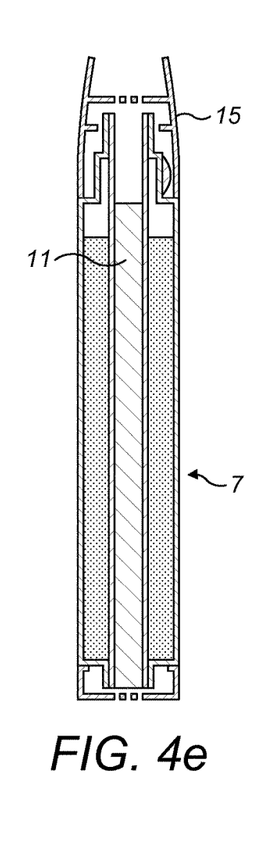

In a fourth step, illustrated in FIG. 4d, a mouthpiece 15 is attached over the end of the double walled tube 1, as indicated by the arrow J, to provide a completed device 7, as shown in FIG. 4e.

In this example, the vent cap 13 and the mouthpiece 15 are separate components to the double walled tube 1 and are assembled onto the double walled tube 1 after the extrusion and molding process described above. In other examples, either or both of the vent cap 13 and the mouthpiece 15 are formed integrally with the double walled tube 1 during the extrusion and molding process described above, for example, by using a suitably shaped mold.

Although in the above described examples, the double walled tubes are configured for use as a heating tube with the annular space defined between the inner and outer tubes configured to contain a material that can be activated to act as a heat source, alternatively, the double walled tubes may be configured for use as a cooling tube with the annular space defined between the inner and outer tubes configured to comprise a material that can be activated to act as a coolant.

The material may be activated to cool a further material contained in the central longitudinal cavity of the double walled tool.

The material that can be activated to act as a coolant may again be a phase change material.

Embodiments of the disclosure are configured to comply with applicable laws and/or regulations, such as, by way of non-limiting example, regulations relating to flavors, additives, emissions, constituents, and/or the like. For example, the invention may be configured such that a device implementing the invention is compliant with applicable regulations before and after adjustment by a user. Such implementations may be configured to be compliant with applicable regulations in all user-selectable positions. In some embodiments, the configuration is such that a device implementing the invention meets or exceeds required regulatory test(s) in all user-selectable positions, such as, by way of non-limiting example, the testing threshold(s)/ceiling(s) for emissions and/or smoke constituents.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc, other than those specifically described herein. In addition, this disclosure may include other inventions not presently claimed, but which may be claimed in future.

The invention claimed is:

1. A method for manufacturing a double-walled tube, the method comprising:
   forming two extruded tubes, wherein an inner extruded tube is arranged inside an outer extruded tube;
   applying a vacuum to a cavity between the outer extruded tube and a mold so as to vacuum mold the outer extruded tube against the mold;
   sealing the inner extruded tube to the outer extruded tube to define a first end of the double-walled tube; and then
   inserting a substance that can be activated to act as a heat source or as a coolant into a cavity between the inner extruded tube and the outer extruded tube.

2. A method according to claim 1, wherein the substance is a fluid.

3. A method according to claim 2, wherein the substance is a phase change material.

4. A method according to claim 3, wherein the phase change material comprises sodium acetate trihydrate.

5. A method according to claim 1, further comprising sealing the inner extruded tube to the outer extruded tube to define a second end of the double-walled tube after inserting the substance into the cavity between the inner extruded tube and the outer extruded tube.

6. A method according to claim 5, further comprising cutting through the first and second ends to release waste material from the double-walled tube.

7. A method according to claim 1, further comprising:
   attaching to the double-walled tube an actuating means for actuating the substance.

8. A method according to claim 1, further comprising:
   pressurizing the longitudinal cavity of the inner extruded tube with fluid when the substance is being inserted into the cavity between the inner extruded tube and the outer extruded tube.

9. A method according to claim 1 further comprising:
   supporting the inner extruded tube on a support inserted through longitudinal cavity of the inner extruded tube when the substance is being inserted into the cavity between the inner extruded tube and the outer extruded tube.

* * * * *